US012463373B2

(12) United States Patent
Arai et al.

(10) Patent No.: US 12,463,373 B2
(45) Date of Patent: Nov. 4, 2025

(54) WIRING MEMBER

(71) Applicant: Sumitomo Wiring Systems, Ltd., Mie (JP)

(72) Inventors: Kenta Arai, Mie (JP); Kazuhiro Nishimura, Mie (JP); Issei Kano, Mie (JP); Haruka Nakano, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 273 days.

(21) Appl. No.: 18/280,971

(22) PCT Filed: Mar. 8, 2022

(86) PCT No.: PCT/JP2022/009987

§ 371 (c)(1),
(2) Date: Sep. 8, 2023

(87) PCT Pub. No.: WO2022/209626

PCT Pub. Date: Oct. 6, 2022

(65) Prior Publication Data

US 2024/0145984 A1 May 2, 2024

(30) Foreign Application Priority Data

Mar. 29, 2021 (JP) ................................ 2021-055884

(51) Int. Cl.
*H01R 13/52* (2006.01)
*H01R 12/77* (2011.01)

(52) U.S. Cl.
CPC ....... *H01R 13/5205* (2013.01); *H01R 12/771* (2013.01)

(58) Field of Classification Search
None
See application file for complete search history.

(56) References Cited

U.S. PATENT DOCUMENTS

| | | | |
|---|---|---|---|
| 6,145,280 A | 11/2000 | Daroux et al. | |
| 2006/0240706 A1* | 10/2006 | Boutin .............. | H01R 13/6392 439/521 |
| 2015/0000973 A1 | 1/2015 | Iio | |

FOREIGN PATENT DOCUMENTS

| | | |
|---|---|---|
| JP | 4-46375 U | 4/1992 |
| JP | 6-124746 | 5/1994 |

(Continued)

OTHER PUBLICATIONS

International Search Report issued in International Patent Application No. PCT/JP2022/009987, dated May 31, 2022, along with an English translation thereof.

(Continued)

*Primary Examiner* — Timothy J Thompson
(74) *Attorney, Agent, or Firm* — Greenblum & Bernstein, P.L.C.

(57) ABSTRACT

A wiring member includes a plurality of electrical wires, a connector, and a waterproof member. The waterproof member is formed by bending the sheet material to cover a region including a front surface, an upper surface, and a side surface continuously formed in the connector housing. The sheet material which has not been bended is connected in a part corresponding to two edge portions of any of an edge portion between the front surface and the upper surface, an edge portion between the front surface and the side surface, and an edge portion between the upper surface and the side surface, and is separated in a part corresponding to a remaining one edge portion.

6 Claims, 4 Drawing Sheets

(56) References Cited

FOREIGN PATENT DOCUMENTS

| | | |
|---|---|---|
| JP | 2000-294060 | 10/2000 |
| JP | 2008-198410 | 8/2008 |
| JP | 2013-134964 | 7/2013 |
| JP | 2016-62675 | 4/2016 |
| WO | 2012/114732 | 8/2012 |
| WO | 2013/108430 | 7/2013 |

OTHER PUBLICATIONS

International Preliminary Report on Patentability issued in International Patent Application No. PCT/JP2022/009987, dated Oct. 12, 2023, along with an English translation thereof.
Japan Office Action issued in Japan Patent Application No. 2021-88491, dated Jul. 1, 2025, together with English translation thereof.
Japan Office Action issued in Japan Patent Application No. 2021-55884, dated Mar. 12, 2024, together with English translation thereof.

* cited by examiner

WIRING MEMBER

TECHNICAL FIELD

The present disclosure relates to a wiring member.

BACKGROUND ART

Patent Document 1 discloses a technique capable of simply making two connectors fitted to each other waterproof using a cover member. The cover member is provided to one of the two connectors before being fitted to each other in a shrunken state. Then, the cover member is extended to the other one of the two connectors after being fitted to each other, thus the two connectors can be simply made to waterproof.

PRIOR ART DOCUMENTS

Patent Document(s)

Patent Document 1: Japanese Patent Application Laid-Open No. 2016-62675

SUMMARY

Problem to be Solved by the Invention

It is desired that a joint connector can be simply made to waterproof while reducing a size of a waterproof member as much as possible.

Accordingly, an object is to provide a technique capable of simply making a joint connector waterproof while reducing a size of a waterproof member as much as possible.

Means to Solve the Problem

A wiring member according to the present disclosure includes: a plurality of electrical wires; a connector to which an end portion of each of the plurality of electrical wires is connected; and a waterproof member formed by a sheet material bended along an outer shape of the connector to cover a periphery of the connector, wherein the connector is a joint connector including a connector housing in which a plurality of cavities are formed and a joint terminal connecting the plurality of electrical wires, the waterproof member includes a first sheet part as a part of the sheet material to cover the connector housing and a second sheet part as another part of the sheet material to cover a part of the plurality of electrical wires extending from a back surface of the connector housing, the first sheet part is formed by bending the sheet material to cover a region including a front surface, an upper surface, and a side surface continuously formed in the connector housing, the sheet material which has not been bended is connected in a part corresponding to two edge portions of any of an edge portion between the front surface and the upper surface, an edge portion between the front surface and the side surface, and an edge portion between the upper surface and the side surface, and is separated in a part corresponding to a remaining one edge portion.

Effects of the Invention

According to the present disclosure, the joint connector can be simply made to waterproof while reducing a size of the waterproof member as much as possible.

DESCRIPTION OF EMBODIMENT(S)

[Description of Embodiment of Present Disclosure]

Figure 1:
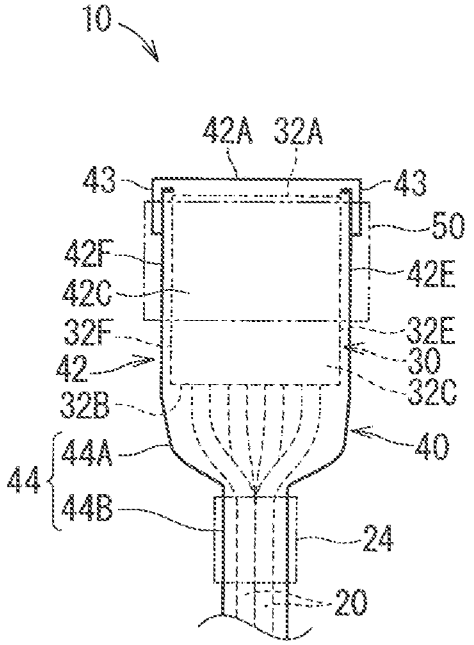
FIG. 1 is a plan view illustrating a wiring member according to an embodiment 1.

Embodiments of the present disclosure are listed and described firstly.

A wiring member according to the present disclosure is as follows.

(1) A wiring member includes: a plurality of electrical wires; a connector to which an end portion of each of the plurality of electrical wires is connected; and a waterproof member formed by a sheet material bended along an outer shape of the connector to cover a periphery of the connector, wherein the connector is a joint connector including a connector housing in which a plurality of cavities are formed and a joint terminal connecting the plurality of electrical wires, the waterproof member includes a first sheet part as a part of the sheet material to cover the connector housing and a second sheet part as another part of the sheet material to cover a part of the plurality of electrical wires extending from a back surface of the connector housing, the first sheet part is formed by bending the sheet material to cover a region including a front surface, an upper surface, and a side surface continuously formed in the connector housing, the sheet material which has not been bended is connected in a part corresponding to two edge portions of any of an edge portion between the front surface and the upper surface, an edge portion between the front surface and the side surface, and an edge portion between the upper surface and the side surface, and is separated in a part corresponding to a remaining one edge portion. The sheet material is bended along the outer shape of the connector, and the waterproof member is formed. The sheet material is connected in the part corresponding to two edge portions of any of the edge portion between the front surface and the upper surface, the edge portion between the front surface and the side surface, and the edge portion between the upper surface and the side surface, and is separated in the part corresponding to the remaining one edge portion. According to these configurations, the joint connector can be simply made to waterproof while reducing a size of the waterproof member as much as possible.

(2) In the wiring member according to (1), the wiring member may include a part where the connector housing and the first sheet part are fixed by a contact area direct fixation. Accordingly, the connector housing and the first sheet part can be fixed without an intervention of the other member in the part where the connector housing and the first sheet part are fixed by the contact area direct fixation.

(3) In the wiring member according to (1) or (2), the wiring member may include a part where the connector housing and the first sheet part are wrapped with a tape and fixed. Accordingly, the connector housing and the first sheet part can be simply fixed in the part where the connector housing and the first sheet part are wrapped with the tape and fixed.

(4) In the wiring member according to any one of (1) to (3), an opening may be formed in a side of a lower surface of the connector housing opposite to the upper surface in the waterproof member. Accordingly, even when water enters an inner part of the waterproof member through a gap occurring in the waterproof member, the water can be exhausted to an outer part of the waterproof member through the opening of the waterproof member, for example.

(5) In the wiring member according to any one of (1) to (4), at least one of the plurality of electrical wires and the second sheet part may be fixed by a contact area fixation. Accordingly, the sheet member can be positioned in an extension direction of the electrical wire.

(6) In the wiring member according to any one of (1) to (5), it is applicable that the sheet material which has not been bended is connected in a part corresponding to two edge portions, that is the edge portion between the front surface and the upper surface and the edge portion between the upper surface and the side surface, and is separated in a part corresponding to the edge portion between the front surface and the side surface. Accordingly, a gap hardly occurs in the edge portion on the upper surface in the waterproof member, and when water is put on the upper surface, the inner part of the connector can be further made to waterproof.

[Detailed Description of Embodiment of Present Disclosure]

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
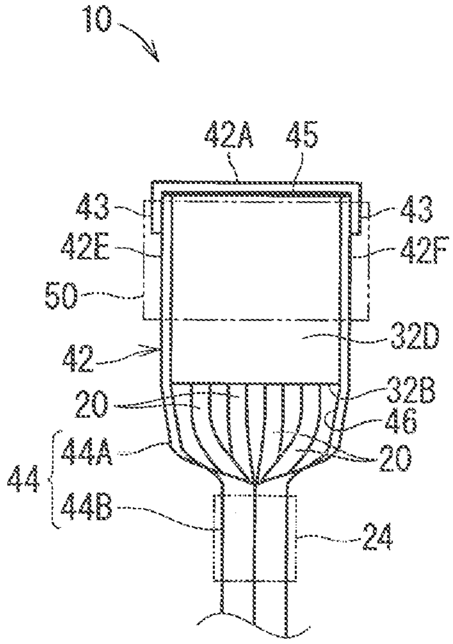
FIG. 2 is a bottom view illustrating the wiring member according to the embodiment 1.
Figure 3:
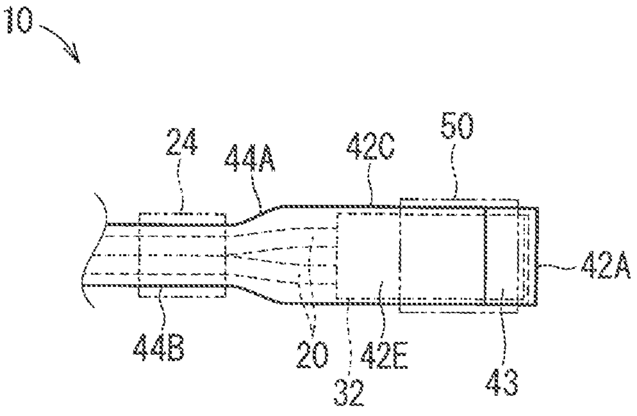
FIG. 3 is a side view illustrating the wiring member according to the embodiment 1.
Figure 4:
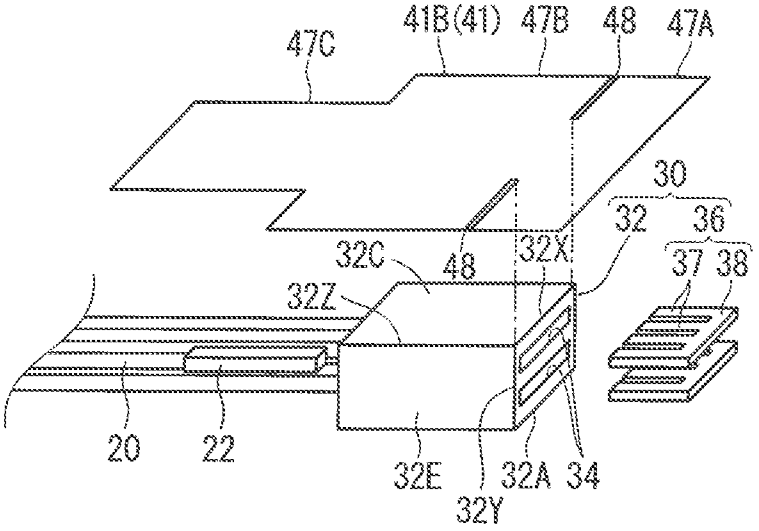
FIG. 4 is an exploded perspective view illustrating the wiring member according to the embodiment 1.

A wiring member according to an embodiment 1 is described hereinafter. FIG. 1 is a plan view illustrating a wiring member 10 according to the embodiment 1. FIG. 2 is a bottom view illustrating the wiring member 10 according to the embodiment 1. FIG. 3 is a side view illustrating the wiring member 10 according to the embodiment 1. FIG. 4 is an exploded perspective view illustrating the wiring member 10 according to the embodiment 1.

The wiring member 10 connects electrical apparatuses mounted to a vehicle. An end portion of the wiring member 10 is disposed in a position on which some water may splash such as an inner part of the vehicle, for example, in the vehicle. The end portion of the wiring member 10 has a simple waterproof structure for splashing of the water (particularly, splashing of the water from an upper side). The wiring member 10 includes a plurality of electrical wires 20, a connector 30, and a waterproof member 40.

The end portions of the plurality of electrical wires 20 are connected to the connector 30. Each electrical wire 20 is a covering wire including a core wire and a covering layer. The core wire includes one or a plurality of strands formed by metal, for example. The covering layer is formed of resin such as polyvinyl chloride (PVC) or polyethylene (PE) extrusion molded around the core wire, for example. A terminal 22 is provided to the end portion of each electrical wire 20. The electrical wire 20 is connected to the connector 30 via the terminal 22, for example. The terminal 22 is electrically connected to the core wire of the electrical wire 20 by crimping, pressure bonding, or melting joint, for example.

Parts of the plurality of electrical wires 20 extending from the connector 30 are bounded into a circular shape by a banding member 24 such as an adhesive tape, a banding band, or a tubular member, for example. The banding member 24 is provided in a position away from the connector 30 along an extension direction of the electrical wire 20.

The plurality of electrical wires 20 are dispersedly formed in positions corresponding to each connection destination in a section (referred to a connection section hereinafter) connected to the connector 30. The plurality of electrical wires 20 are collected to be firmly attached to each other in a section (referred to as a banding section hereinafter) where the plurality of electrical wires 20 are bundled by the banding member 24. The plurality of electrical wires 20 have collection forms shifted between an arrangement of being dispersedly formed in the connection section and an arrangement of being collected in the banding section in a section between the connection section and the banding section (referred to as a shift section hereinafter). Specifically, the plurality of electrical wires 20 are collected so that intervals therebetween are gradually narrowed from the connection section to the banding section in the shift section. The plurality of electrical wires 20 are separated so that intervals therebetween gradually increase from the banding section to the connection section in the shift section.

The connector 30 is a joint connector 30. The connector 30 includes a connector housing 32 and a joint terminal 36. A plurality of cavities 33 are formed in the connector housing 32. The end portion of the electrical wire 20 (herein, the terminal 22 and a part of the electrical wire 20 connected to the terminal 22) is inserted into each cavity 33. The joint terminal 36 connects the plurality of electrical wires 20. Herein, the joint terminal 36 is connected to the plurality of terminals 22, thereby connecting the plurality of electrical wires 20.

The connector housing 32 is formed of resin having insulation properties, for example. In the description herein, the connector housing 32 is formed into a rectangular parallelpiped shape and has six surfaces. When two surfaces directed to sides opposite to each other in six surfaces are defined as one group of surfaces, six surfaces are classified into a group of a front surface 32A and a back surface 32B, a group of an upper surface 32C and a lower surface 32D, and a group of a first side surface 32E and a second side surface 32F. The front surface 32A is a surface into which the joint terminal 36 is inserted. The back surface 32B is a surface into which the end portion of the electrical wire 20 is inserted. The upper surface 32C, the lower surface 32D, the first side surface 32E, and the second side surface 32F are four surfaces between the front surface 32A and the back surface 32B. The upper surface 32C is a surface directed to an upper side in a vertical direction when the wiring member 10 is disposed in a vehicle, and the lower surface 32D is a surface directed to a lower side in the vertical direction when the wiring member 10 is disposed in the vehicle. Herein, the front surface 32A has a rectangular shape, thus four surfaces between the front surface 32A and the back surface 32B have two surfaces having a large width continuously formed with a long side of the front surface 32A and two surface having a small width continuously formed with a short side of the front surface 32A. Herein, two surface having the large width continuously formed with the long side of the front surface 32A are defined as the upper surface 32C and the lower surface 32D. Two surfaces having the small width continuously formed with the short side of the front surface 32A may be defined as the upper surface and the lower surface.

The joint terminal 36 is formed into a plate-like shape by metal, for example. The joint terminal 36 includes a plurality of connection parts 37 and one joint part 38. Each connection part 37 is connected to the end portion of the electrical wire 20 (herein, the terminal 22). The joint part 38 joins the plurality of connection parts 37. The plurality of connection parts 37 protrude to one side from the joint part 38 at intervals corresponding to the plurality of cavities 33.

The plurality of cavities 33 are opened to both a side of the front surface 32A and a side of the back surface 32B. In each cavity 33, the connection part 37 of the joint terminal 36 is inserted into the cavity 33 from the opening on the side of the front surface 32A. In each cavity 33, the end portion of the electrical wire 20 is inserted into the cavity 33 from the opening on the side of the back surface 32B.

Herein, one connector housing 32 holds both the electrical wire 20 and the joint terminal 36. Thus, a housing space 34 housing the joint part 38 of the joint terminal 36 is formed in a position closer to the side of the front surface 32A in relation to the plurality of cavities 33. The plurality of cavities 33 are communicated with the housing space 34 through the opening on the side of the front surface 32A. Then, the opening of the housing space 34 is formed in the front surface 32A.

However, one connector housing 32 may not hold both the electrical wire 20 and the joint terminal 36. The connector housing 32 may include a first housing holding the electrical wire 20 and a second housing holding the joint terminal 36. The first and second housings may be detachably attached after being molded separately from each other.

In the example illustrated in FIG. 4, eight cavities 33 are formed in an arrangement of two stages and four rows. Needless to say, the number and arrangement of the cavities 33 in the connector housing 32 are not limited thereto, but can be appropriately set. For example, the cavities 33 in the connector housing 32 may be arranged in one stage or three or more stages. In the example illustrated in FIG. 4, the electrical wires 20 housed in the cavities 33 in each stage are connected by one joint terminal 36. Needless to say, the connection destination of the joint terminal 36 in the connector 30 is not limited thereto, but can be appropriately set. For example, the electrical wires 20 housed in the cavities 33 in multiple stages and multiple rows may be connected by one joint terminal 36.

The waterproof member 40 is formed by bending a sheet material 41 along the outer shape of the connector 30 to cover a periphery of the connector 30. The waterproof member 40 includes a first sheet part 42 and a second sheet part 44. The first sheet part 42 is a part of the sheet material 41 to cover the connector housing 32. The second sheet part 44 is the other part of the sheet material 41 to cover a part of the plurality of electrical wires 20 extending from the back surface 32B of the connector housing 32.

The first sheet part 42 is formed by bending the sheet material 41 to cover a region including the front surface 32A, the upper surface 32C, and the side surface 32E (herein, both the first side surface 32E and the second side surface 32F) continuously formed in the connector housing 32. The first sheet part 42 includes a front surface cover part 42A, an upper surface cover part 42C, and side surface cover parts 42E and 42F. A protrusion piece 43 is provided to a lateral side of the front surface cover part 42A. The protrusion piece 43 is bended to be overlapped with the side surface cover parts 42E and 42F.

Provided to the wiring member 10 is a part where the connector housing 32 and the first sheet part 42 are wrapped with a tape and fixed. An adhesive tape 50 wound around the connector housing 32 and the first sheet part 42 is wound around the upper surface 32C and the side surfaces 32E and 32F as illustrated in FIG. 1 and FIG. 2. The adhesive tape 50 is wound around a part where the protrusion piece 43 and the side surface cover parts 42E and 42F are overlapped with each other. In the example illustrated in FIG. 1 and FIG. 2, the side surface cover parts 42E and 42F in the protrusion piece 43 and the side surface cover parts 42E and 42F are located on a side of the connector housing 32, however, the protrusion piece 43 may be located on the side of the connector housing 32.

The second sheet part 44 covers at least a region of the shift section in the plurality of electrical wires 20. Herein, the second sheet part 44 also covers a region of the banding section in the plurality of electrical wires 20. A base end portion 44A located in the shift section in the second sheet part 44 is connected to the first sheet part 42. The base end portion 44A in the second sheet part 44 extends to have a shape similar to the first sheet part 42. A tip end portion 44B located in the banding section in the second sheet part 44 is bundled with the plurality of electrical wires 20 by the banding member 24. In the shift section, the second sheet part 44 and the plurality of electrical wires 20 are not bundled by the banding member 24. The tip end portion 44B of the second sheet part 44 covers the plurality of electrical wires 20 more firmly than the base end portion 44A. The base end portion 44A of the second sheet part 44 covers the plurality of electrical wires 20 more loosely than the tip end portion 44B.

The tip end portion 44B of the second sheet part 44 surrounds a whole periphery of the plurality of electrical wires 20, and the base end portion 44A of the second sheet part 44 does not surround the whole periphery of the plurality of electrical wires 20. However, the tip end portion 44B of the second sheet part 44 may not surround the whole periphery of the plurality of electrical wires 20. The base end portion 44A of the second sheet part 44 may surround the whole periphery of the plurality of electrical wires 20. A range where the tip end portion 44B of the second sheet part 44 is provided along the extension direction of the electrical wire 20 is optionally set. For example, the tip end portion 44B of the second sheet part 44 may be provided over the whole banding section, or may also be provided to only a part of the banding section. For example, the tip end portion 44B of the second sheet part 44 may be provided to have a length large enough to slightly protrude from a banding band as the banding member 24. For example, the tip end portion 44B of the second sheet part 44 may be provided to have a length slightly larger than a width dimension of an adhesive tape as the banding member 24.

Openings 45 and 46 are formed in the waterproof member 40 on a side of the lower surface 32D opposite to the upper surface 32C of the connector housing 32. The openings 45 and 46 are used as a drainage hole in a case where water enters an inner part of the waterproof member 40. Herein, the waterproof member 40 is provided with two openings 45 and 46. The opening 45 is located closer to the side of the front surface 32A in relation to the adhesive tape 50. The opening 46 is located closer to the side of the back surface 32B in relation to the adhesive tape 50. The adhesive tape 50 is not wound around the front surface 32A. The adhesive tape 50 is wound around a region other than an edge portion between the front surface 32A and the lower surface 32D. Thus, a region between the front surface 32A and the tip end portion 44B of the front surface cover part 42A is not completely covered, but the opening 45 is formed. The adhesive tape 50 and the banding member 24 are not would around the base end portion 44A of the second sheet part 44. The base end portion 44A in the second sheet part 44 extends to have a shape similar to the first sheet part 42. Accordingly, the opening 46 is formed on the side of the lower surface 32D in the second sheet part 44.

<Sheet Material 41 which has not been Bended>

Figure 5:
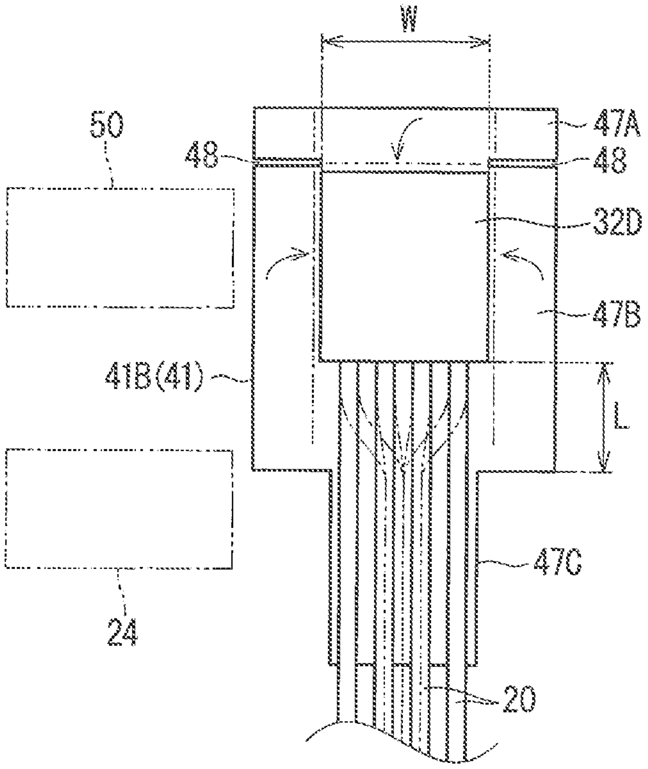
FIG. 5 is a bottom view illustrating that a sheet material which has not been bended is attached to a connector.

The sheet material 41 which has not been bended is described with reference to FIG. 5 in addition to FIG. 1 to FIG. 4. FIG. 5 is a bottom view illustrating that the sheet material 41 which has not been bended is attached to the connector 30. In the description hereinafter, a sign B is assigned to the sheet material 41 which has not been bended, thus such a sheet material 41 is referred to as the sheet material 41B.

The sheet material 41B is connected in apart corresponding to two edge portions of any of an edge portion 32X between the front surface 32A and the upper surface 32C, an edge portion 32Y between the front surface 32A and the side surface 32E, and an edge portion 32Z between the upper surface 32C and the side surface 32E, and is separated in a part corresponding to a remaining one edge portion. In the present example, the sheet material 41B is connected in a part corresponding to two edge portions 32X and 32Z, that is the edge portion 32X between the front surface 32A and the upper surface 32C and the edge portion 32Z between the upper surface 32C and the side surface 32E, and is separated in a part corresponding to the edge portion 32Y between the front surface 32A and the side surface 32E.

The sheet material 41B includes a first region, a second region, and a third region. The first region, the second region, and the third region are continuously formed in this order along a first direction. The first region includes a part covering the front surface 32A of the connector housing 32 in a state of serving as the waterproof member 40. The second region includes a part covering the upper surface 32C and the side surfaces 32E and 32F of the connector housing 32 in a state of serving as the waterproof member 40. Herein, the second region also includes a part covering the electrical wire 20 in a state of serving as the waterproof member 40. The third region includes a part covering the electrical wire 20 in a state of serving as the waterproof member 40. Each of the first region, the second region, and the third region has a rectangular shape including an edge portion along the first direction (up-down direction in FIG. 5) and an edge portion along a second direction (right-left direction in FIG. 5). In the description hereinafter, the first region, the second region, and the third region are first rectangular part 47A, a second rectangular part 47B, and a third rectangular part 47C, respectively.

In the first direction, a dimension of the first rectangular part 47A is smaller than that of the second rectangular part 47B. In the first direction, the dimension of the first rectangular part 47A is the same as a height dimension of the connector housing 32 (interval between the upper surface 32C and the lower surface 32D). In the first direction, the dimension of the second rectangular part 47B is the same as or larger than a depth dimension of the connector housing 32 (interval between the front surface 32A and the back surface 32B). Herein, in the first direction, a dimension of the second rectangular part 47B is larger than the depth dimension of the connector housing 32 by a dimension IL in FIG. 5. In the first direction, a part of the second rectangular part 47B larger than the connector housing 32 (a part assigned with the dimension L in FIG. 5) covers the electrical wire 20 extending from the connector housing 32 in a state of serving as the waterproof member 40.

The dimension L can be appropriately set, and may be equal to or larger than two thirds of the width dimension W of the connector housing 32, for example. When the plurality of electrical wires 20 extending from the connector housing 32 are bundled into a circular shape, force in the width direction of the connector housing 32 is applied in some of the electrical wires 20 while the plurality of electrical wires 20 are collected from the connection section to the banding section, and force of the electrical wires 20 having contact with a peripheral edge portion of the opening of the cavity 33 may increase or a posture of the terminal 22 in the cavity 33 may be inclined. At this time, when the part of the plurality of electrical wires 20 which have been bundled is away from the connector housing 32, the force of the electrical wires 20 having contact with the peripheral edge portion of the opening of the cavity 33 is suppressed, and the posture of the terminal 22 in the cavity 33 is hardly inclined. At this time, when the dimension L is equal to or larger than two thirds of the width dimension W of the connector housing 32, excessive increase of the force of the connector housing 32 applied on the electrical wire 20 is suppressed, and the force of the electrical wires 20 having contact with the peripheral edge portion of the opening of the cavity 33 and the posture of the terminal 22 in the cavity 33 are easily within an appropriate range.

The dimension of the second rectangular part 47B in the second direction is equal to a sum of twice the height dimension of the connector housing 32 and the width dimension W (interval between the first side surface 32E and the second side surface 32F) of the connector housing 32. In the second direction, the dimension of the first rectangular part 47A is the same as that of the second rectangular part 47B. In the second direction, the dimension of the first rectangular part 47A may be smaller than that of the second rectangular part 47B. In the second direction, it is sufficient that the dimension of the first rectangular part 47A is equal to or larger than the width dimension W of the connector housing 32.

The first rectangular part 47A and the second rectangular part 47B are connected in a part along the second direction, and are not connected in the other part. The first rectangular part 47A and the second rectangular part 47B are connected in an intermediate part along the second direction. A part where the first rectangular part 47A and the second rectangular part 47B are connected is a part corresponding to the edge portion 32X between the front surface 32A and the upper surface 32C. The first rectangular part 47A and the second rectangular part 47B are not connected in one end portion and the other end portion along the second direction. A part where the first rectangular part 47A and the second rectangular part 47B are not connected corresponds to the edge portion 32Y between the front surface 32A and the side surfaces 32E and 32F. A slit 48 extending in the second direction from the edge portion along the first direction is formed in the sheet material 41B. A part where the slit 48 is formed is a part corresponding to the edge portion 32Y between the front surface 32A and the side surfaces 32E and 32F.

A part of the second rectangular part 47B connected to the first rectangular part 47A serves as the upper surface cover part 42C in the waterproof member 40. A part of the first rectangular part 47A connected to the second rectangular part 47B is bended to serve as the front surface cover part 42A in the waterproof member 40 based on this part hereinafter. Parts of the first rectangular part 47A and the second rectangular part 47B which are not connected to each other (a part separated by the slit 48) are bended to cover the side surfaces 32E and 32F in the waterproof member 40. A part of the second rectangular part 47B which is not connected to the first rectangular part 47A covers the whole side surfaces 32E and 32F to serve as the side surface cover parts 42E and 42F in the waterproof member 40. A part of the first rectangular part 47A which is not connected to the second rectangular part 47B covers a part of the side surfaces 32E and 32F on the side of the front surface 32A to serve as the protrusion piece 43 in the waterproof member 40.

A part of the second rectangular part 47B on a side of the third rectangular part 47C protrudes from the connector housing 32. The part of the second rectangular part 47B protruding from the connector housing 32 serves as a base end portion 44A in the second sheet part 44 in the waterproof member 40. The third rectangular part 47C serves as a tip end portion 44B of the second sheet part 44 in the waterproof member 40. A part of the second rectangular part 47B connected to the third rectangular part 47C is bundled with the plurality of electrical wires 20 by the banding member 24.

A dimension of the third rectangular part 47C is optionally set. The dimension of the third rectangular part 47C in the first direction is appropriately set in accordance with a dimension of the tip end portion 44B of the second sheet part 44 along the extension direction of the electrical wire 20. Herein, the dimension of the third rectangular part 47C is smaller than that of the first rectangular part 47A and the second rectangular part 47B in the second direction. When the tip end portion 44B of the second sheet part 44 surrounds the whole periphery of the bundle of electrical wires 20, the dimension of the third rectangular part 47C is preferably large enough to surround the whole periphery of the bundle of electrical wires 20 in the second direction. When the tip end portion 44B of the second sheet part 44 does not surround the whole periphery of the bundle of electrical wires 20, the dimension of the third rectangular part 47C may not be large enough to surround the whole periphery of the bundle of electrical wires 20 in the second direction.

It is sufficient that the sheet material 41B can be bended. It is sufficient that the sheet material 41B includes a waterproof layer through which water, for example, cannot pass between one main surface and the other main surface. The waterproof layer may be a sheet having an evenly filled cross-sectional surface (also referred to as a non-foam sheet or a solid sheet), for example. The waterproof layer may be an independent foam sheet, for example. The sheet material 41B may also have a single layer structure made up of only the waterproof layer. The sheet material 41B may also have a multilayer structure made up of the waterproof layer and an additional layer stacked to each other. The additional layer may not have waterproof properties. The additional layer may be a continuous foam sheet in addition to the sheet as the waterproof layer described above. The additional layer may be a fibrous material sheet such as a woven cloth, a knitted cloth, or a non-woven cloth, for example. A material constituting the sheet is not particularly limited, but resin or metal can be used.

<Effect Etc.>

According to the wiring member 10 having the above configuration, the sheet material 41B is bended along the outer shape of the connector 30, and the waterproof member 40 is formed. The sheet material 41B is connected in the part corresponding to two edge portions of any of the edge portion 32X between the front surface 32A and the upper surface 32C, the edge portion 32Y between the front surface 32A and the side surface 32E, and the edge portion 32Z between the upper surface 32C and the side surface 32E, and is separated in the part corresponding to the remaining one edge portion. Accordingly, the joint connector 30 can be simply made to waterproof while reducing the size of the waterproof member 40 as much as possible. The wiring member 10 can simply conform with a different type of connector 30 by changing the shape of the sheet material 41B.

Provided to the wiring member 10 is the part where the connector housing 32 and the first sheet part 42 are wrapped with the adhesive tape 50 and fixed. Accordingly, the connector housing 32 and the first sheet part 42 can be simply fixed in the part where the connector housing 32 and the first sheet part 42 are wrapped with the tape and fixed.

The openings 45 and 46 are formed in the waterproof member 40 on the side of the lower surface 32D opposite to the upper surface 32C of the connector housing 32. Accordingly, even when water enters the inner part of the waterproof member 40 through the gap occurring in the waterproof member 40, the water can be exhausted to the outer part of the waterproof member 40 through the openings 45 and 46 of the waterproof member 40, for example.

The sheet material 41B which has not been bended is connected in the part corresponding to two edge portions 32X and 32Z, that is the edge portion 32X between the front surface 32A and the upper surface 32C and the edge portion 32Z between the upper surface 32C and the side surface 32E, and is separated in the part corresponding to the edge portion 32Y between the front surface 32A and the side surface 32E. Accordingly, the gap hardly occurs in the edge portions 32X and 32Z on the upper surface 32C in the waterproof member 40, and when water is put on the upper surface 32C, the inner part of the connector 30 can be further made to waterproof.

Modification Example

Figure 6:
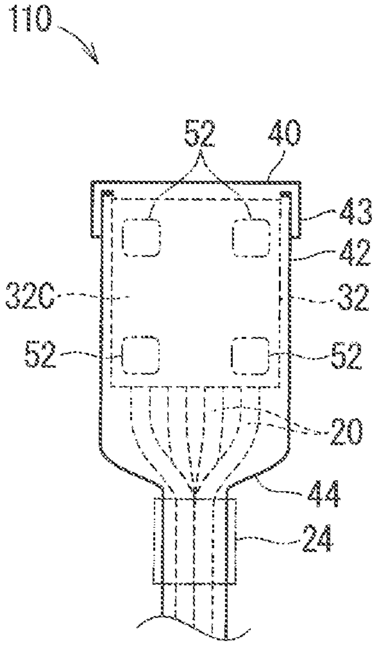
FIG. 6 is a plan view illustrating a wiring member according to a modification example.
Figure 7:
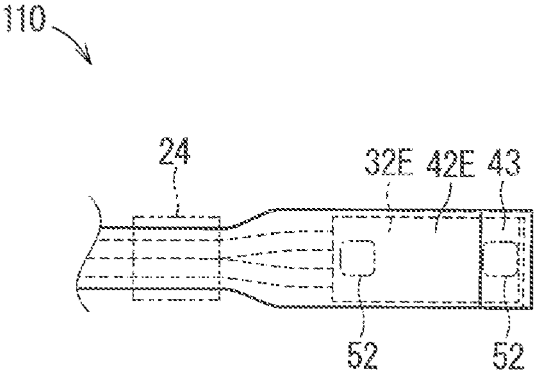
FIG. 7 is a side view illustrating the wiring member according to the modification example.
Figure 8:
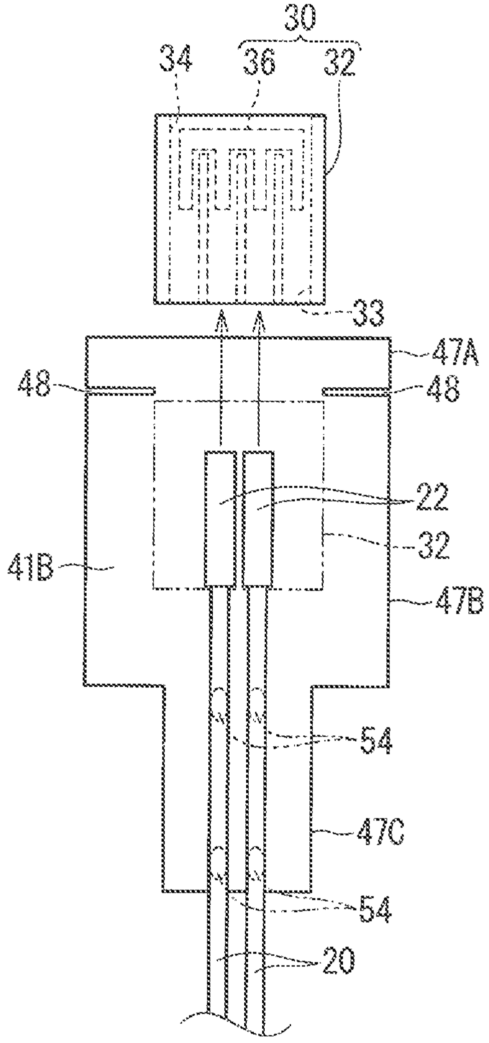
FIG. 8 is a bottom view illustrating manufacture of the wiring member according to the modification example.

FIG. 6 is a plan view illustrating a wiring member 110 according to a modification example. FIG. 7 is a side view illustrating the wiring member 110 according to the modification example. FIG. 8 is a bottom view illustrating manufacture of the wiring member 110 according to the modification example.

Provided to the wiring member 10 is a fixing part 52 where the connector housing 32 and the first sheet part 42 are fixed by a contact area direct fixation. Accordingly, the connector housing 32 and the first sheet part 42 can be fixed without an intervention of the other member in the fixing part 52 where the connector housing 32 and the first sheet part 42 are fixed by the contact area direct fixation.

The contact area direct fixation indicates that the connector housing 32 and the first sheet part 42 are directly stuck and fixed without an intervention of the adhesive agent, for example, which is separately provided. Considered in the contact area direct fixation is that resin included in at least one of the connector housing 32 and/or the sheet material 41B is melted, thus the connector housing 32 and the sheet material 41B are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. Herein, the connector housing 32 and the first sheet part 42 are fused to each other. In this case, it is sufficient that at least one of the connector housing 32 and/or the first sheet part 42 includes thermoplastic resin. When the first sheet part 42 includes thermoplastic resin, the waterproof layer may include thermoplastic resin, or the additional layer may also include thermoplastic resin. Herein, the waterproof layer includes thermoplastic resin. The thermoplastic resin is not particularly limited, but may be PVC, polyethylene terephthalate (PET), or polyolefin, for example. When both the connector housing 32 and the first sheet part 42 include thermoplastic resin, it is sufficient that thermoplastic resin included in the connector housing 32 and thermoplastic resin included in the first sheet part 42 has compatibility.

A position of the fixing part 52 can be appropriately set. In the present example, the upper surface 32C and the upper surface cover part 42C are fixed by a contact area direct fixation. The side surfaces 32E and 32F and the side surface cover parts 42E and 42F are fixed by a contact area direct fixation. The protrusion piece 43 may also be fixed by a contact area direct fixation in the fixing part 52 where the side surfaces 32E and 32F and the side surface cover parts 42E and 42F are fixed by a contact area direct fixation. In the present example, fixation of the connector housing 32 and the first sheet part 42 wrapped with a tape is omitted. In the present example, the connector housing 32 and the first sheet part 42 are fixed by only the fixing part 52.

Both a contact area direct fixation and fixation by wrapping with a tape may be applied together as fixation of the connector housing 32 and the first sheet part 42. In this case, the fixing part 52 where the connector housing 32 and the first sheet part 42 are fixed by a contact area direct fixation may be used for fixation of positioning the connector housing 32 and the first sheet part 42 until wrapping with a tape is performed. For example, some of the surfaces of the connector housing 32 may be fixed to a corresponding part of the sheet material 41B by a contact area direct fixation. The sheet material 41B may be bended to cover the other surface of the connector housing 32 based on the part fixed to the connector housing 32.

In the example illustrated in FIG. 8, at least one of the plurality of electrical wires 20 and the third rectangular part 47C are fixed by a contact area fixation to form the fixing part 54. The third rectangular part 47C serves as the second sheet part 44 in the waterproof member 40. Accordingly, at least one of the plurality of electrical wires 20 and the second sheet part 44 are in a state of a contact area fixation in the wiring member 10. Accordingly, the sheet material 41 can be positioned in the extension direction of the electrical wire 20.

Applicable as the state of the contact area fixation is a contact area indirect fixation in addition to the contact area direct fixation described above. Herein, the contact area indirect fixation indicates that the electrical wire 20 and the second sheet part 44 are indirectly stuck and fixed via an adhesive member such as an adhesive agent, a gluing agent, and a double-sided adhesive tape provided therebetween.

When the electrical wire 20 and the second sheet part 44 are fused to each other, it is sufficient that at least one of the electrical wire 20 and/or the second sheet part 44 includes thermoplastic resin. When the second sheet part 44 includes thermoplastic resin, the waterproof layer may include thermoplastic resin, or the additional layer may also include thermoplastic resin. Herein, the waterproof layer includes thermoplastic resin. The thermoplastic resin is not particularly limited, but may be PVC, polyethylene terephthalate (PET), or polyolefin, for example. When both the electrical wire 20 and the second sheet part 44 include thermoplastic resin, it is sufficient that thermoplastic resin included in the electrical wire 20 and thermoplastic resin included in the second sheet part 44 has compatibility. For example, thermoplastic resin included in the electrical wire 20 and thermoplastic resin included in the second sheet part 44 may be the same type of resin.

The electrical wire 20 is preferably fixed to the second sheet part 44 by a contact area fixation in a section other than the connection section and the shift section. The electrical wire 20 is preferably fixed to the second sheet part 44 by a contact area fixation in the banding section. The fixing part 54 is preferably provided to the banding section. The plurality of fixing parts 54 are provided along the extension direction of the electrical wire 20. One fixing part 54 may be provided along the extension direction of the electrical wire 20. After the electrical wire 20 is fixed to the third rectangular part 47C by a contact area fixation, it is applicable that the end portion thereof is striped, and the terminal 22 is attached to the electrical wire 20 so that the electrical wire 20 is connected to the connector 30. Only some of the plurality of electrical wires 20 are fixed to the second sheet part 44 by a contact area fixation. Some of the electrical wires 20 is selected in an optional way. For example, the electrical wire 20 in a stage on the side of the upper surface 32C or in a stage on the side of the lower surface 32D may be selected. For example, the electrical wire 20 located in a middle of a row may be selected, or the electrical wire located in an end of a row may be selected. All of the plurality of electrical wires 20 may be fixed to the second sheet part 44 by a contact area fixation.

In the above description, the openings 45 and 46 are formed in the waterproof member 40 on the side of the lower surface 32D opposite to the upper surface 32C of the connector housing 32, however, this configuration is not necessary. The openings 45 and 46 may not be formed in the waterproof member 40 on the side of the lower surface 32D opposite to the upper surface 32C of the connector housing 32.

It is also applicable that the sheet material 41 is connected in the part corresponding to two edge portions 32X and 32Y, that is the edge portion 32X between the front surface 32A and the upper surface 32C and the edge portion 32Y between the front surface 32A and the side surface 32E, and is separated in the part corresponding to the edge portion 32Z between the upper surface 32C and the side surface 32E. In this case, the protrusion piece 43 may be configured to cover the whole side surface 32E in place of the side surface cover part 42E in the waterproof member 40. In the sheet material 41 in this case, the dimension of the first rectangular part 47A in the second direction is the same as a sum of twice the depth dimension of the connector housing 32 and the width dimension W of the connector housing 32, and the second rectangular part 47B has substantially the same width dimension as the third rectangular part 47C.

It is also applicable that the sheet material 41 is connected in the part corresponding to two edge portions 32Y and 32Z, that is the edge portion 32Z between the upper surface 32C and the side surface 32E and the edge portion 32Y between the front surface 32A and the side surface 32E, and is separated in the part corresponding to the edge portion 32X between the front surface 32A and the upper surface 32C. In this case, in the waterproof member 40, also applicable is a configuration that a protrusion piece protrudes from the side surface cover part 42E, and covers the whole front surface 32A in place of the front surface cover part 42A. In the sheet material 41 in this case, the dimension of the first rectangular part 47A in the first direction is the same as the width dimension of the connector housing 32, and the dimension of the first rectangular part 47A in the second direction is the same as the height dimension of the connector housing 32. The first rectangular part 47A and the second rectangular part 47B are connected to one end portion of the second rectangular part 47B in the second direction.

The configurations described in the embodiments and modification examples thereof can be appropriately combined as long as they are not contradictory.

EXPLANATION OF REFERENCE SIGNS

10, 110 wiring member
20 electrical wire
22 terminal
24 banding member
30 connector
32 connector housing
32A front surface
32B back surface
32C upper surface
32D lower surface
32E first side surface
32F second side surface
32X, 32Y, 32Z edge portion
33 cavity
34 housing space
36 joint terminal
37 connection part
38 joint part
40 waterproof member
41, 41B sheet material
42 first sheet part
42A front surface cover part
42C upper surface cover part
42E first side surface cover part
42F second side surface cover part
43 protrusion piece
44 second sheet part
44A base end portion
44B tip end portion
45, 46 opening
47A first rectangular part
47B second rectangular part
47C third rectangular part
48 slit
50 adhesive tape
52, 54 fixing part

The invention claimed is:

1. A wiring member, comprising:
a plurality of electrical wires;
a connector to which an end portion of each of the plurality of electrical wires is connected; and
a waterproof member formed by a sheet material bended along an outer shape of the connector to cover a periphery of the connector, wherein
the connector is a joint connector including a connector housing in which a plurality of cavities are formed and a joint terminal connecting the plurality of electrical wires,
the waterproof member includes a first sheet part as a part of the sheet material to cover the connector housing and a second sheet part as another part of the sheet material to cover a part of the plurality of electrical wires extending from a back surface of the connector housing,
the first sheet part is formed by bending the sheet material to cover a region including a front surface, an upper surface, and a side surface continuously formed in the connector housing,
the sheet material which has not been bended is connected in a part corresponding to two edge portions of any of an edge portion between the front surface and the upper surface, an edge portion between the front surface and the side surface, and an edge portion between the upper surface and the side surface, and is separated in a part corresponding to a remaining one edge portion.

2. The wiring member according to claim 1, wherein
the wiring member includes a part where the connector housing and the first sheet part are fixed by a contact area direct fixation.

3. The wiring member according to claim 1, wherein
the wiring member includes a part where the connector housing and the first sheet part are wrapped with a tape and fixed.

4. The wiring member according to claim 1, wherein
an opening is formed in a side of a lower surface of the connector housing opposite to the upper surface in the waterproof member.

5. The wiring member according to claim 1, wherein
at least one of the plurality of electrical wires and the second sheet part are fixed by a contact area fixation.

6. The wiring member according to claim 1, wherein
the sheet material which has not been bended is connected in a part corresponding to two edge portions, that is the edge portion between the front surface and the upper surface and the edge portion between the upper surface and the side surface, and is separated in a part corresponding to the edge portion between the front surface and the side surface.

* * * * *